(12) United States Patent
Bamfield et al.

(10) Patent No.: US 9,290,193 B1
(45) Date of Patent: Mar. 22, 2016

(54) REAL-TIME GRAPHICAL DISPLAY OF LADDER LOGIC FOR RAILROAD EQUIPMENT

(71) Applicant: Siemens Industry, Inc., Alpharetta, GA (US)

(72) Inventors: Richard Bamfield, Ruby Bay (NZ); Adam Moorhouse, Fontana, CA (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 9 days.

(21) Appl. No.: 14/171,864

(22) Filed: Feb. 4, 2014

(51) Int. Cl.
  *B61L 29/00* (2006.01)
  *B61L 99/00* (2006.01)
  *B61L 23/00* (2006.01)

(52) U.S. Cl.
  CPC .............. *B61L 99/00* (2013.01); *B61L 23/00* (2013.01); *B61L 29/00* (2013.01)

(58) Field of Classification Search
  CPC .................................. B61L 23/00; B61L 29/00
  USPC .......... 701/1, 19, 20, 24, 36, 117–119; 104/2, 104/18, 27, 88.01–88.06, 307
  See application file for complete search history.

(56) References Cited

U.S. PATENT DOCUMENTS

| | | | |
|---|---|---|---|
| 6,580,953 B1 * | 6/2003 | Wiebe et al. | 700/86 |
| 7,188,057 B2 * | 3/2007 | Birkelbach et al. | 703/7 |
| 7,353,093 B2 * | 4/2008 | Bamfield et al. | 701/19 |
| 7,725,303 B2 * | 5/2010 | Tramontana | 703/13 |
| 7,832,691 B2 * | 11/2010 | Reibeling et al. | 246/125 |
| 2006/0265111 A1 * | 11/2006 | Bamfield et al. | 701/19 |
| 2008/0073466 A1 * | 3/2008 | Mardirossian | 246/125 |
| 2009/0184214 A1 * | 7/2009 | Reibeling et al. | 246/125 |
| 2014/0012438 A1 * | 1/2014 | Shoppa et al. | 701/19 |

* cited by examiner

*Primary Examiner* — Thomas Tarcza
*Assistant Examiner* — Tyler J Lee

(57) ABSTRACT

A method and system for graphically displaying real-time system logic used for troubleshooting railroad equipment such as e.g., a grade crossing predictor. The method and system graphically display ladder logic equations used to formulate a system status output, allowing a technician or other personnel to quickly determine the cause of an anomaly reflected in the output.

24 Claims, 12 Drawing Sheets

REAL-TIME GRAPHICAL DISPLAY OF LADDER LOGIC FOR RAILROAD EQUIPMENT

FIELD OF THE INVENTION

Embodiments of the invention relate to railroad equipment such as e.g., grade crossing predictors and, more particularly, to the real-time graphical display of the underlying logic used to formulate status outputs of railroad equipment such as e.g., a grade crossing predictor.

BACKGROUND

A grade crossing predictor (often referred to as a crossing predictor in the U.S., or a level crossing predictor in the U.K.) is an electronic device that is connected to the rails of a railroad track and is configured to detect the presence of an approaching train and determine its speed and distance from a crossing (i.e., a location at which the tracks cross a road, sidewalk or other surface used by moving objects). The grade crossing predictor will use this information to generate a constant warning time signal for controlling a crossing warning device. A crossing warning device is a device that warns of the approach of a train at a crossing, examples of which include crossing gate arms (e.g., the familiar black and white striped wooden arms often found at highway grade crossings to warn motorists of an approaching train), crossing lights (such as the red flashing lights often found at highway grade crossings in conjunction with the crossing gate arms discussed above), and/or crossing bells or other audio alarm devices. Grade crossing predictor are often (but not always) configured to activate the crossing warning device at a fixed time (e.g., 30 seconds) prior to an approaching train arriving at a crossing.

Typical grade crossing predictors include a transmitter that transmits a signal over a circuit formed by the track's rails and one or more termination shunts positioned at desired approach distances from the transmitter, a receiver that detects one or more resulting signal characteristics, and a logic circuit such as a microprocessor or hardwired logic that detects the presence of a train and determines its speed and distance from the crossing. The approach distance depends on the maximum allowable speed of a train, the desired warning time, and a safety factor. Preferred embodiments of grade crossing predictors generate and transmit a constant current AC signal on the track circuit; the predictor detects a train and determines its distance and speed by measuring impedance changes caused by the train's wheels and axles acting as a shunt across the rails, which effectively shortens the length (and hence lowers the impedance) of the rails in the circuit. Multiple grade crossing predictors can monitor a given track circuit if each predictor measures track impedance at a different frequency. Measurement frequencies are chosen such that they have a low probability of interfering with each other while also avoiding power line harmonics.

As is known in the art, there is a need to confirm that grade crossing predictors, as well as other railroad equipment, are operating properly to ensure public safety at railroad crossings. Troubleshooting a grade crossing predictor often involves connecting a laptop to the predictor and accessing diagnostics screens to see if system status outputs (e.g., electrical signals) indicate that the equipment is functioning correctly. Because the diagnostic screens only provide the end results of how the predictor is working with limited information about the inputs used to achieve the results, a maintainer must review reference manuals, installation diagrams, event diagrams and/or other materials to determine the cause of detected problems/anomalies.

As can be appreciated, this process requires a fair bit of experience and guess work on the part of the maintainer, since the underlying logic used to formulate the system outputs is not explained or visible. The maintainer will typically spend a great deal of time searching through the screens and paperwork to determine where an anomaly lies—this is undesirable as it wastes manpower and could cause the railroad equipment to remain in a sub-optimal operating state until the problem is fixed. Moreover, the process involves guess work, hunches and previous experience with the equipment, which is also undesirable.

Thus, there is a need and desire for a better troubleshooting technique for railroad equipment such as e.g., grade crossing predictors.

SUMMARY

Embodiments disclosed herein provide a method and system for graphically displaying real-time logic used to formulate a system status output to troubleshoot railroad equipment such as e.g., a grade crossing predictor. The method and system graphically display ladder logic equations (i.e., data and logical operations) used to formulate a system status output, allowing the maintainer or other personnel to quickly determine the cause of an anomaly reflected in the output. Internal timers can also be displayed so that the maintainer can determine when a state change is about to occur.

Further areas of applicability of the present disclosure will become apparent from the detailed description, drawings and claims provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

As is described below in more detail, the disclosed embodiments display the underlying logical equations used to formulate a system status output (e.g., an electrical signal indicative of the status of a system function), which can be used to troubleshoot railroad equipment such as e.g., a grade crossing predictor. In one embodiment, ladder logic equations used to formulate a system status output are displayed on an integrated display of a grade crossing predictor. Internal timers can also be displayed so that the maintainer can determine when a state change is about to occur (or should occur). In another embodiment, the ladder logic equations and/or internal timers are accessed via a webpage-based graphical user interface from an external device connected to the railroad equipment. The underlying ladder logic equations are displayed in a manner that resembles relay logic installation diagrams so that they are inherently familiar to the maintainer, simplifying the usual troubleshooting process. Hereinafter, the disclosed embodiments are described as being used with/for a grade crossing predictor. It should be appreciated, however, that this is just one example use of the disclosed embodiments and that they can be used with other railroad equipment such as e.g., geographical signaling devices/systems.

Figure 1:
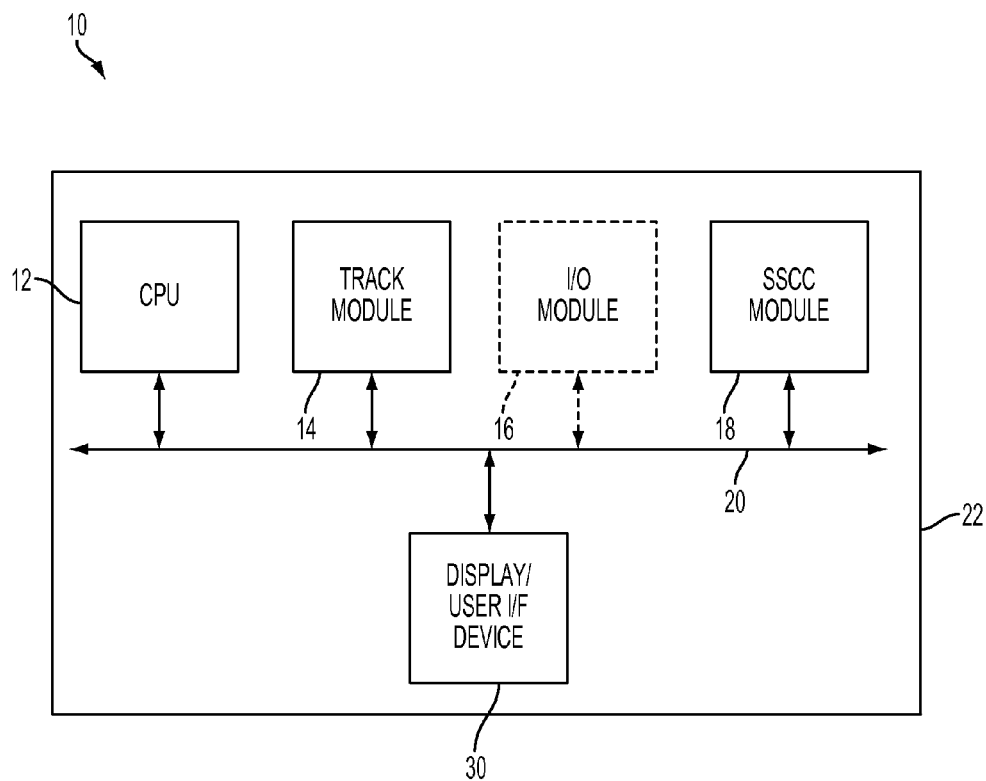
FIG. 1 illustrates a block diagram of a railroad system having an integrated display/user interface device according to an embodiment disclosed herein.

FIG. 1 illustrates an example railroad system 10 according to an embodiment disclosed herein. In the illustrated example embodiment, the system 10 is a grade crossing predictor having a central processing unit (CPU) 12, at least one track module 14, at least one solid state crossing predictor (SSCC) module 18 and a display/user interface device 30. The system 10 may include additional input/output (I/O) modules 16 if desired. Example I/O modules 16 for a railroad application include relay input/output (RIO) modules and phase shift oscillator (PSO) modules. In one embodiment, the CPU 12, track module(s) 14, I/O module(s) 16 (if implemented), SSCC module 18 and display/user interface device 30 are integrated within a single housing 22 such as e.g., a card cage or similar type of housing. The CPU 12, track module(s) 14, I/O module(s) 16 (if implemented), SSCC module 18 and display/user interface device 30 communicate via a bus 20 or backplane of the housing 22. In a desired embodiment, the display/user interface device 30 comprises a display screen and a separate control portion (e.g., keypad, directional controls and an enter button). It should be appreciated, however, that the display/user interface device 30 could comprise a touchscreen display device if desired.

For the system 10 to operate as a grade crossing predictor, each track module 14 is connected to the rails of a respective railroad track (not shown) and is designed to transmit signals having a specific frequency along the rails of its respective track. Each track module 14 receives signals from the rails it is connected to and detects the presence/absence of a train based on the track's impedance. Each track module 14 sends Boolean state information to the CPU 12, which uses logic (e.g., ladder logic equations) to determine when to activate the crossing warning device. When it is determined that the crossing warning device should be activated, the CPU 12 sends control signals to the SSCC module 18, which typically rings the bell, flashes the lights and drops the gate arms of the crossing warning device. When the output of the track module 14 indicates that no train is present, the logic within the CPU 12 determines that crossing warning device can be deactivated. When it is determined that the crossing warning device should be deactivated, the CPU 12 sends control signals to the SSCC module 18, which stops ringing the bell, stops flashing the lights and raises the gate arms of the crossing warning device.

As mentioned above, the CPU 12 is programmed with logic (e.g., ladder logic equations) that takes certain system data as inputs and manipulates the data inputs according to pre-defined equations or mathematical operations to create and/or drive certain system status outputs. Ladder logic equations include a series of inputs connected at or between points corresponding to logical operations. Visually, the connections often resemble rungs on a ladder. In one embodiment, the CPU 12 has two processors—one vital (often referred to as a vital logic processor or VLP) and one non-vital (often referred to as a communications processor or CP). The VLP has an engine that can generically process ladder logic equations, but does not have the actual logic built therein. Therefore, a module configuration file (MCF), which is stored in the CPU's 12 memory or another memory device in the system 10, is created to determine how the system 10 is used and to identify what modules are present in the system 10 and where the modules are positioned within the housing 22. In addition, the MCF contains all of the ladder logic equations required by the system 10 to function properly. When the system 10 is turned on, the VLP loads the MCF to configure all of the ladder logic equations for the CPU 12. In one embodiment, an auxiliary file containing similar information as the MCF is transmitted to the display/user interface device 30 via the CP so that the device 30 knows how the system 10 is configured.

If one or more system status outputs reveal an anomaly, it is desirable for the maintainer to have access to the ladder logic equations (i.e., the input data and logical operations) to see what system factors are contributing to the anomaly. The input data can be the status of a component (i.e., energized, de-energized, operational, failed, etc.), data output from a component, an output from another ladder logic equation, or data from an external source. Thus, in accordance with a first disclosed embodiment, the system 10 displays, on the integrated display/user interface device 30, a real-time graphical representation of the underlying ladder logic equations used to formulate a system status output. It should also be appreciated that any logical equation/process beneficial to diagnosing problems within the system 10 can be stored and displayed in accordance with the disclosed principles.

Because the display/user interface device 30 has the auxiliary file containing the ladder logic equations used by the CPU 12, the CP within the CPU 12 merely needs to transmit real-time data updates to the device 30, which are then displayed in ladder logic form (discussed below). The device 30 will process the raw ladder logic equations to determine how to graphically display them, while also requesting real-time updates of the data/values currently being displayed. The device 30 has a generic set of rules for how to display the data in a graphical ladder logic diagram. In one embodiment, the CPU 12 provide rules to the device 30, which the device 30 uses to parse out elements from being displayed. For example, if a user has turned a feature off, then displaying data about that feature may not be desirable. Accordingly, the CP can instruct the device 30 not to display the feature. The device 30, re-arranges its display without the turned off feature.

Figure 2:
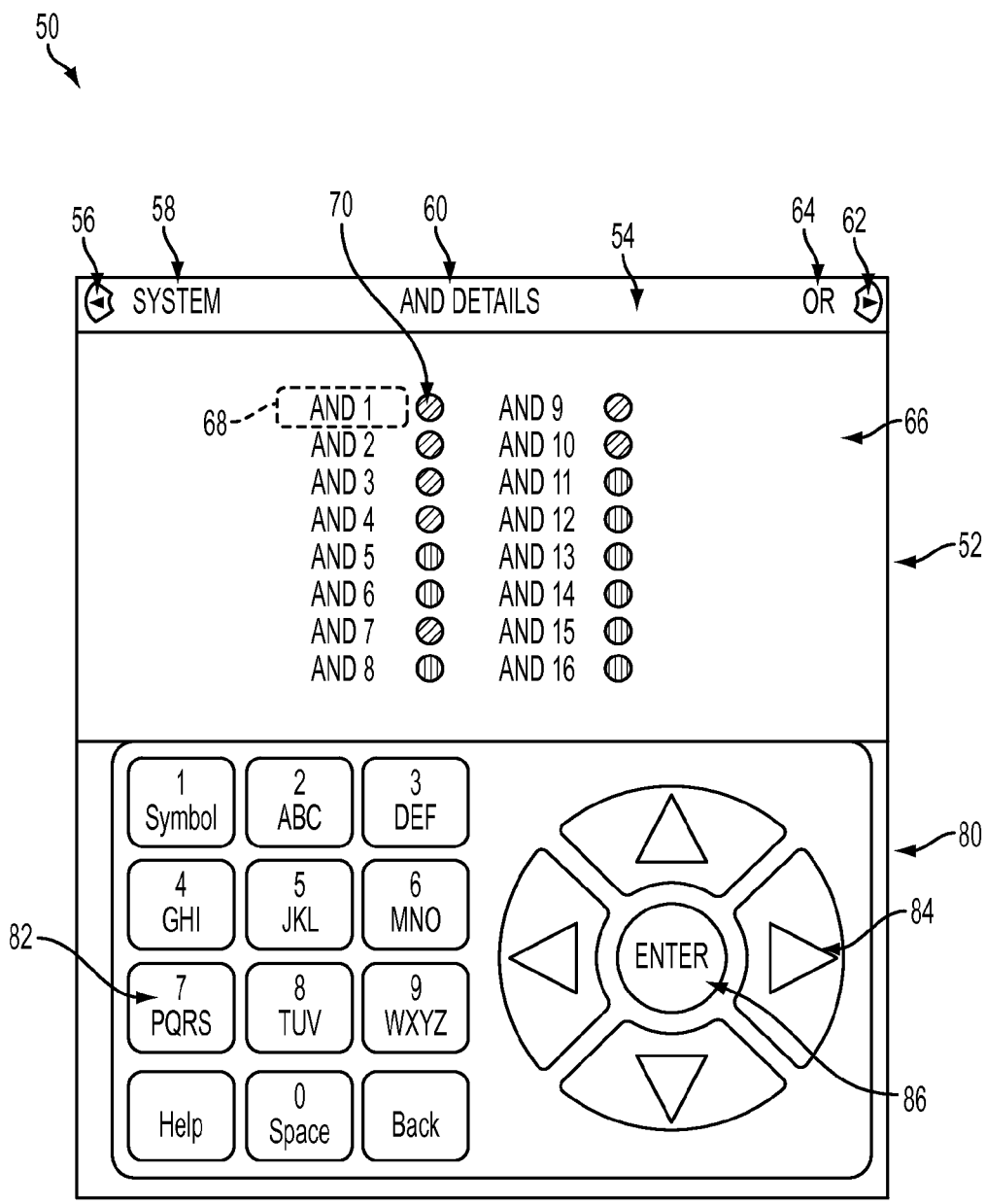
FIGS. 2-6 illustrate example graphical user interface screens displayed on the display/user interface device of FIG. 1 according to an embodiment disclosed herein.

FIG. 2 illustrates an example user interface screen 50 that can be displayed on the display/user interface device 30. The screen 50 includes a display portion 52 that includes a header 54 having a title 60 indicating what screen 50 is currently being displayed (e.g., "AND Details"). The header 54 also includes a first symbol 56 representing a navigate left/back command, which is associated with a first label 58 indicating that the "System" screen will be accessed in response to the navigate left/back command. Likewise, the header 54 also includes a second symbol 62 representing a navigate right/forward command, which is associated with a second label 64 indicating that the "OR" screen will be accessed in response to the navigate right/forward command. It should be appreciated that the title and labels used in FIG. 2, as well as in the other figures discussed herein, are merely examples and that any descriptive titles/labels can be used when practicing the embodiment.

The display portion 52 also includes a body portion 66. The body portion 66 includes a list containing the names of ladder logic equations 68 and the corresponding status 70 for each equation 68. As set forth above, the display/user interface device 30 has an auxiliary file with the ladder logic equations used by the CPU 12 and uses the information in the auxiliary file to drive the various screens discussed herein. Status data for each equation is received from the CPU 12 and formatted for display by the device 30. In essence, the illustrated screen 50 is a main screen for the equations 68 associated with the title 60 of the screen 50. In the illustrated example, all of the equations 68 are categorized as being "AND" equations associated with the "AND Details" title 60. In one embodiment, different colors are used to represent different possible statuses of the ladder logic equations 68. For example, the color green could be associated with a normal operational status, while the color red could be used when an anomaly is detected. Thus, the maintainer can access screen 50 to get an overall status of all ladder logic equations 68 associated with the title 60. As is discussed below in more detail, each ladder logic equation 68 can be selected using the control portion 80 to obtain the underlying details (i.e., the logic flow and data inputs) for that equation 68.

The device 30 also includes a control portion 80 having a keypad 82, directional arrows 84 and an enter button 86 in the desired embodiment. It should be appreciated, however, that these control could be implemented via software buttons if the display/user interface device 30 is a touchscreen display device. The directional arrows 84 can be used to highlight one of the ladder logic equations 68 in the display portion 52. In the illustrated example, the ladder logic equation "AND 1" is highlighted and can be selected if a user presses the enter button 86. Once selected, a new screen associated with the selected equation is displayed to reveal the real-time details of the underlying data and logic of the equation. As with other displayed screens, the device 30 sends a request for data from the CPU 12 and uses the data to populate the screen being displayed.

Figure 3:
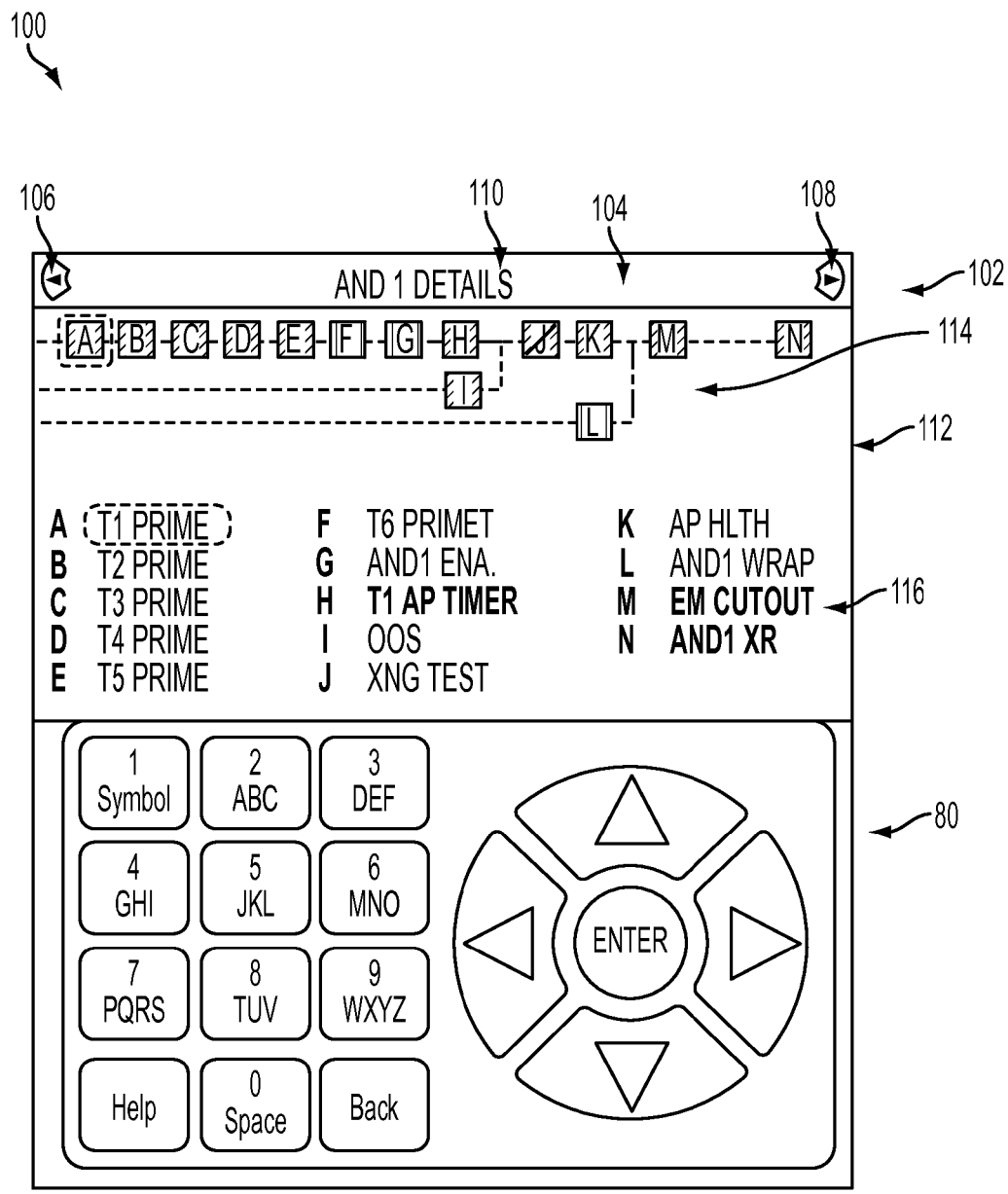

FIG. 3 illustrates an example user interface screen 100 that can be displayed on the display/user interface device 30 after a particular ladder logic equation 68 (FIG. 2) has been selected. The screen 100 has a display portion 102 comprising a header 104 and body 112. The header 104 includes a title 110 (e.g., "AND 1 Details") corresponding to the name of the selected ladder logic equation 68 of FIG. 2. The header 104 also includes navigation symbols 106, 108. The body 112 illustrates a real-time ladder logic equation 114 comprised of inputs A-M, output N and logic operations (i.e., horizontal lines are "AND" operations, vertical lines are "OR" operations, and inputs with a "/" are NOT operations) performed on the inputs A-M to achieve the output N. Body portion 112 also includes a listing of detailed descriptors 116 associated with the inputs A-M and output N within the equation 114.

In one embodiment, different colors are used to represent different possible statuses of the inputs A-M and output N. For example, the color green could be associated with an energized input/output, while the color red could be associated with a de-energized input/output. In the illustrated example, inputs F, G and L are de-energized, while all other inputs and output N are energized. As can be seen, the maintainer can quickly determine causes for an abnormal system status output based on the data and logical associations in the ladder logic equation 114. The descriptors 116 can also be associated with colors. For example, a first color can be used to indicate that the descriptor 116 can be selected to reveal more information about that descriptor (i.e., it could reveal another screen, data values, another ladder logical flow or other information showing why the input is energized or not). A second color can be used to show that the descriptor 116 cannot be selected to reveal more data about the input. In the illustrated example, input A has the descriptor "T1 Prime" and is shown as being highlighted and selectable. If the user selected this descriptor 116, more information about the "T1 Prime" input would be requested from the CPU 12 and subsequently displayed in a new screen or on top of the current screen.

Figure 4:
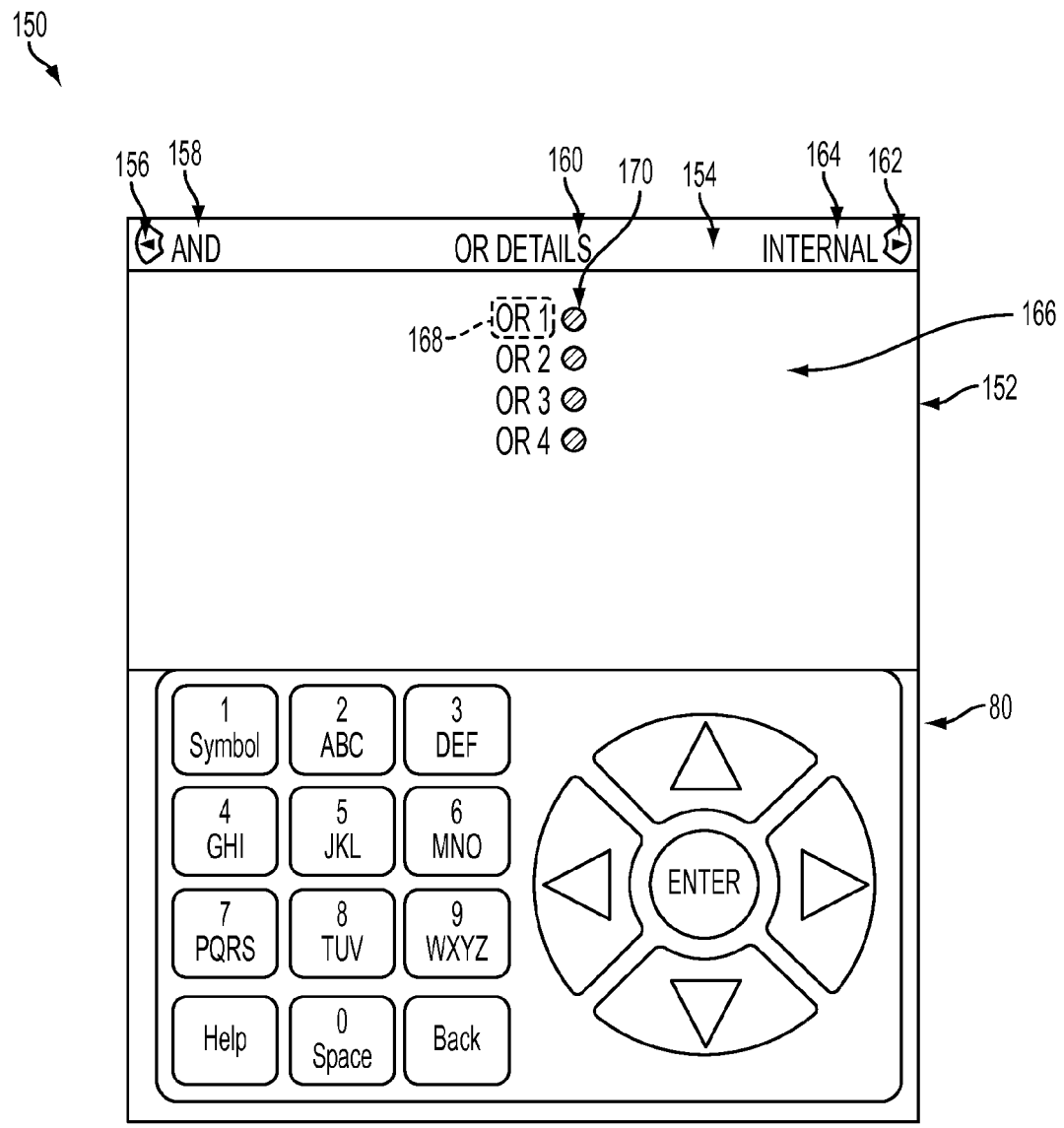

FIG. 4 illustrates another example user interface screen 150 that can be displayed on the display/user interface device 30. The screen 150 includes a display portion 152 that includes a header 154 having a title 160 indicating what screen 150 is currently being displayed (e.g., "OR Details"). The header 154 also includes a first symbol 156 representing a navigate left/back command, which is associated with a first label 158 indicating that the "AND" screen will be accessed in response to the navigate left/back command. Likewise, the header 154 also includes a second symbol 162 representing a navigate right/forward command, which is associated with a second label 164 indicating that the "Internal" screen will be accessed in response to the navigate right/forward command.

The display portion 152 also includes a body portion 166. The body portion includes a list comprising the names of ladder logic equations 168 and the corresponding status 170 for each equation 168. In essence, the illustrated screen 150 is a main screen for equations 168 associated with the title 160 of the screen 150. In the illustrated example, all of the ladder logic equations 168 are categorized as being "OR" equations associated with the "OR Details" title 160. As in other embodiments, different colors are used to represent different possible statuses of the ladder logic equations 168. Thus, the maintainer can access screen 150 to get an overall status of all equations 168 associated with the title 160. Like other embodiments, each ladder logic equation 168 can be selected using the control portion 80 to obtain the underlying details (i.e., the logic flow and data inputs) for that equation 168.

Figure 5:
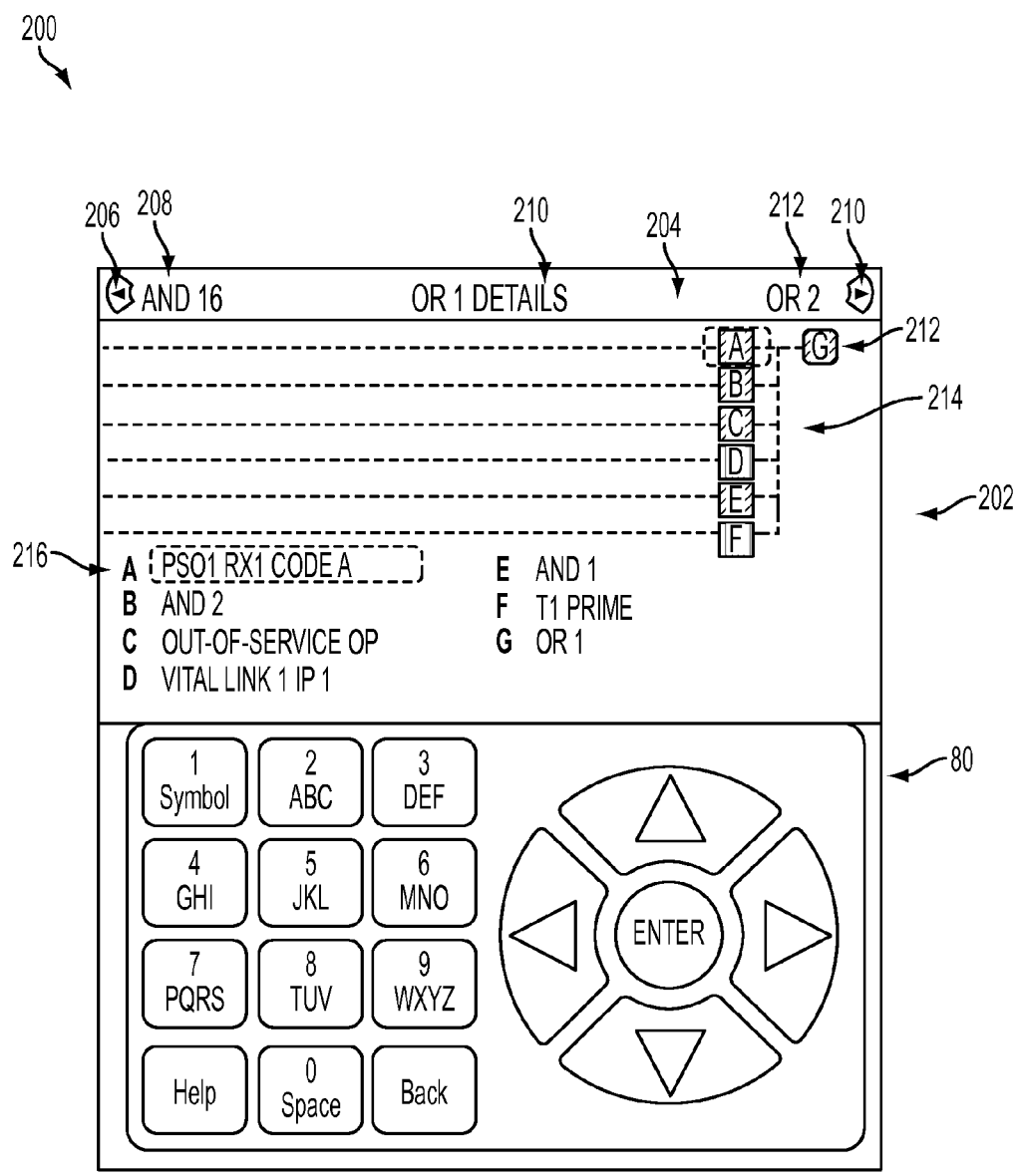

In the illustrated example, the ladder logic equation "OR 1" is highlighted and can be selected if a user presses the "enter" button on the controls 80. Once selected, a new screen associated with the selected equation is displayed to reveal the real-time details of the underlying data and logic for the equation. FIG. 5 illustrates an example user interface screen 200 that can be displayed on the display/user interface device 30 after a particular ladder logic equation 168 (FIG. 4) has been selected. The screen 200 has a display portion 202 comprising a header 204 and body 212. The header 204 includes a title 210 (e.g., "OR 1 Details") corresponding to the selected ladder logic equation 168 of FIG. 4. The header 204 also includes navigation symbols 206, 210 and labels 208, 212. The body 212 illustrates a real-time ladder logic equation 214 comprised of inputs A-F, output G and logic operations (i.e., vertical lines are "OR" operations) performed on the inputs A-F to achieve the output G. Body 212 also includes a listing of detailed descriptors 216 associated with the inputs A-F and output G.

As with the prior embodiments, different colors are used to represent different possible statuses of the inputs A-F and output G. For example, the color green could be associated with an energized input/output, while the color red could be associated with a de-energized input/output. In the illustrated example, inputs D and F are de-energized, while all other inputs and output G are energized. As can be seen, the maintainer can quickly determine causes for an abnormal status output based on the data and logical associations in the ladder logic equation 214. As with the prior embodiments, the descriptors 216 can also be associated with colors to represent whether they are selectable, to reveal more information about that descriptor, or not selectable. In the illustrated example, input A has the descriptor "PSO1 RX1 Code A" and is shown as being highlighted and selectable. If the user selected this descriptor 216, more information about the "PSO1 RX1 Code A" input would be requested from the CPU 12 and subsequently displayed.

Figure 6:
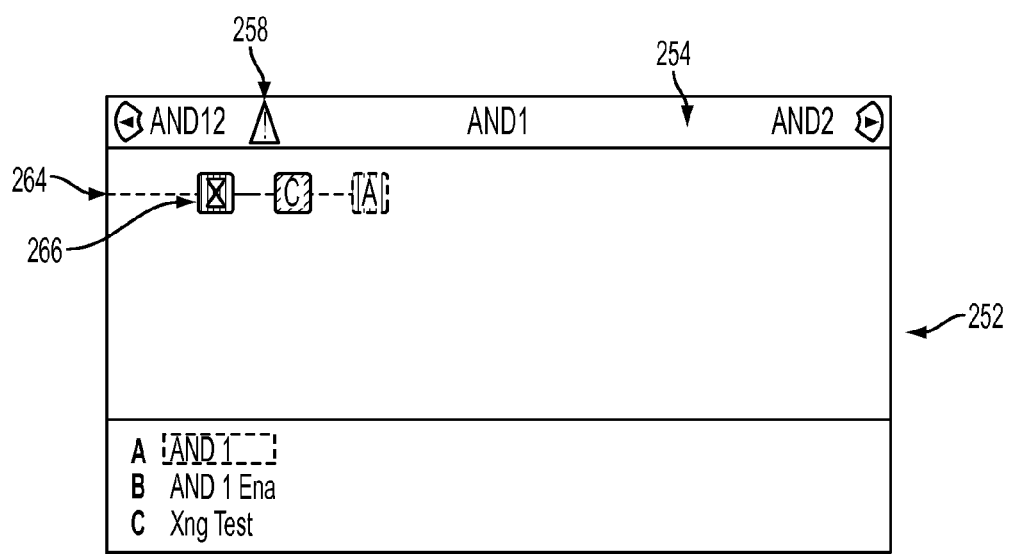

The embodiments disclosed herein can also be used to display timers indicating that a state change may occur when the timer expires. For example, in FIG. 6, a display portion 252 illustrates a ladder logic equation 264 having a timer symbol 266 over an input. In the illustrated embodiment, the timer symbol 266 is an hour glass, but it should be appreciated that any symbol may be used when practicing the disclosed embodiment. The timer symbol 266 can be used to show that the status of input A may change when the timer expires. For example, it some instances, it may be desirable to wait a certain amount of time after an input is energized before declaring it energized (e.g., provide time to allow the input to settle before applying it to the rest of the logic flow). In those instances, the timer symbol 266 can be displayed to alert the maintainer of the situation. The timer 266 can have one color when it is active, a second color when it is about to expire and a third color after it has expired. Alternatively, or in addition to, the symbol for the timer 266 can disappear after it has expired. FIG. 6 also illustrates a caution symbol 258 in the header 254. The caution symbol 258 can be used to alert the maintainer that there is a problem e.g., at the system level or on the current screen. The caution symbol 258 can be used to indicate that there is a diagnostic message present and that more information is available.

So far, the disclosed embodiments have been described as being used with a grade crossing predictor system 10 having an integrated display/user interface device 30. It should be appreciated, however, that the disclosed principles should not be limited to use with such a device 30. For example, in another embodiment, the disclosed principles can be applied to a system similar to system 10, with or without the display/user interface device 30, through use of a webpage-based graphical user interface running on an external personal computer or laptop. In one embodiment, the device running the webpage-based graphical user interface (i.e., web browser) can be connected directly to one of the modules in the system 10 or the display/user interface device 30 via a cable (e.g., an Ethernet cable). In addition to, or alternatively, the webpage-based graphical user interface can connect to the system 10 over a local network connection or the Internet if the user and its device are provided with the appropriate network security clearance. Once connected to the system 10, an auxiliary file with the ladder logic equations used by the CPU 12 is transmitted and stored at the computer, which uses the information in the auxiliary file to drive the various screens discussed herein.

Figure 7:
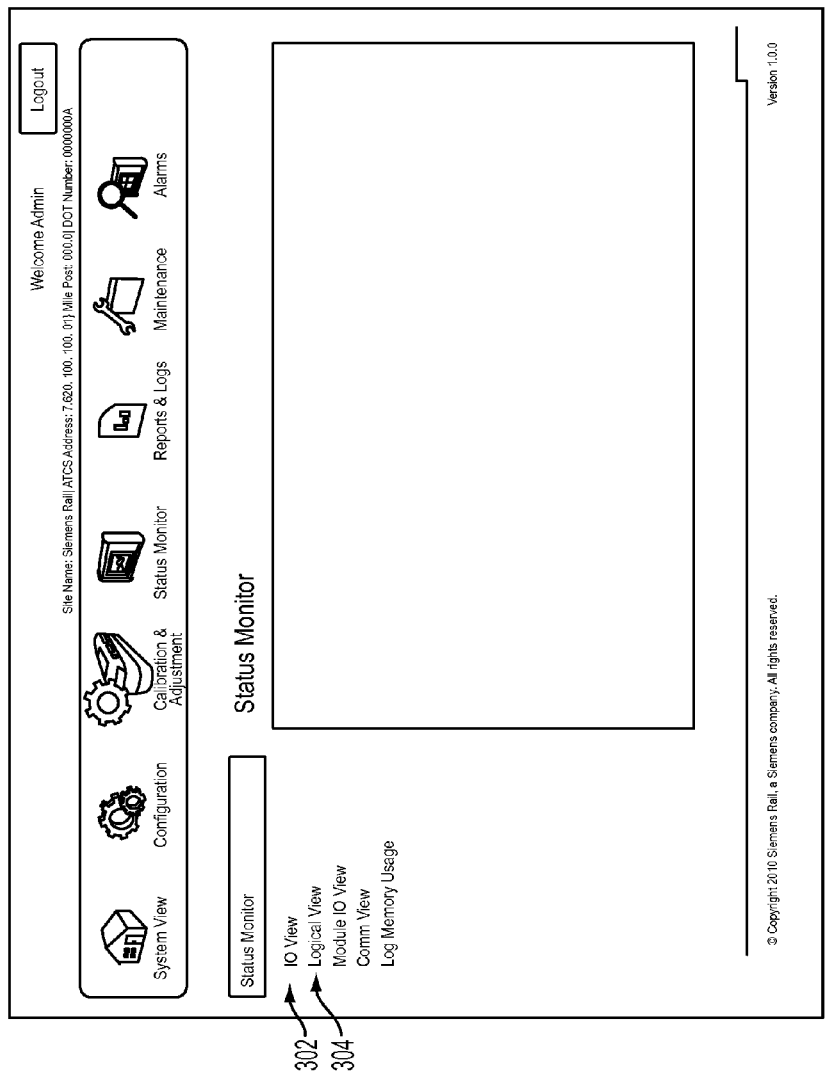
FIGS. 7-11 illustrate example webpage-based graphical user interface pages according to another embodiment disclosed herein.

The webpage-based graphical user interface (e.g., browser) will be executed the computer/laptop's processor as is known in the art. The system 10 will provide information in web-based form for display through the browser on the computer/laptop. FIG. 7 illustrates an example page 300 of the webpage-based graphical user interface according to a disclosed embodiment. The page 300 is a "status monitor" page, providing the user with a listing 302 of options that can be monitored. One item in the options list 302 is a "Logical View" option 304 that, when selected, will provide the user with similar graphical views of ladder logic equations discussed above with reference to FIGS. 2-6.

Figure 8:
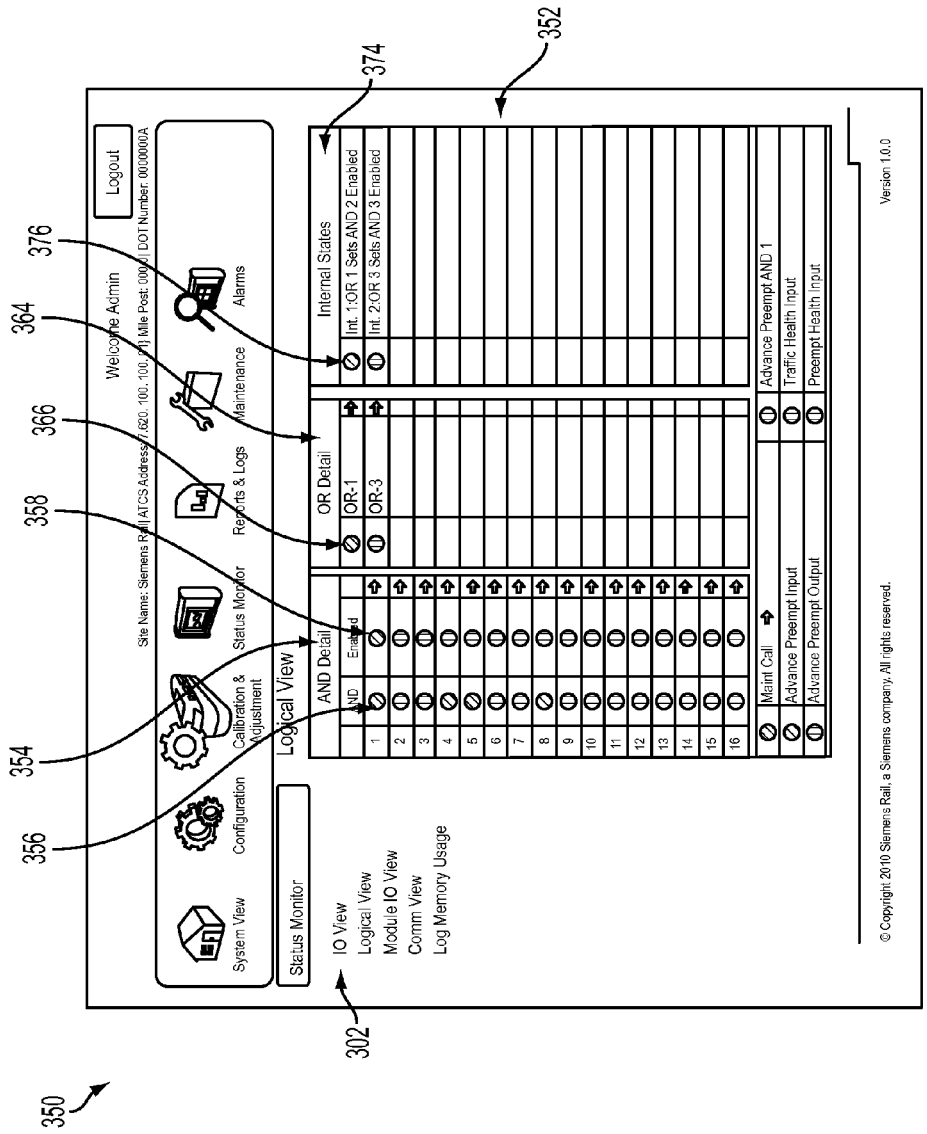

For example, FIG. 8 illustrates an example "Logical View" page 350, which is displayed after the user selected the "Logical View" option 304 of FIG. 7. In addition to the option list 302, the page 350 includes a display portion 352 comprising three summary portions 354, 364, 374. The first summary portion 354 is labeled "AND Detail" and in the example provides the status of sixteen "AND" ladder logic equations 356 and whether the system status output determined by the equation is enabled 358. The second summary portion 364 is labeled "OR Detail" and in the example provides the status of two "OR" ladder logic equations 366. The third summary portion 374 is labeled "Internal States" and in the example provides the status of two internal state functions 376. It should be appreciated that more description labeling could be used to represent the ladder logic equations and that the embodiment is not limited to the example labels used herein.

As with other embodiments, the status indicators 356, 366, 376 can have one color to represent normal operation and another color to represent a detected anomaly. Likewise, the enabled indicator 358 can have one color to represent enabled/energized and another color to represent disabled/de-energized. If a user selects one of the ladder logic equations (by clicking one of the indicators 356, 366), a new webpage containing data and logical associations within the ladder logic equation is displayed.

Figure 9:
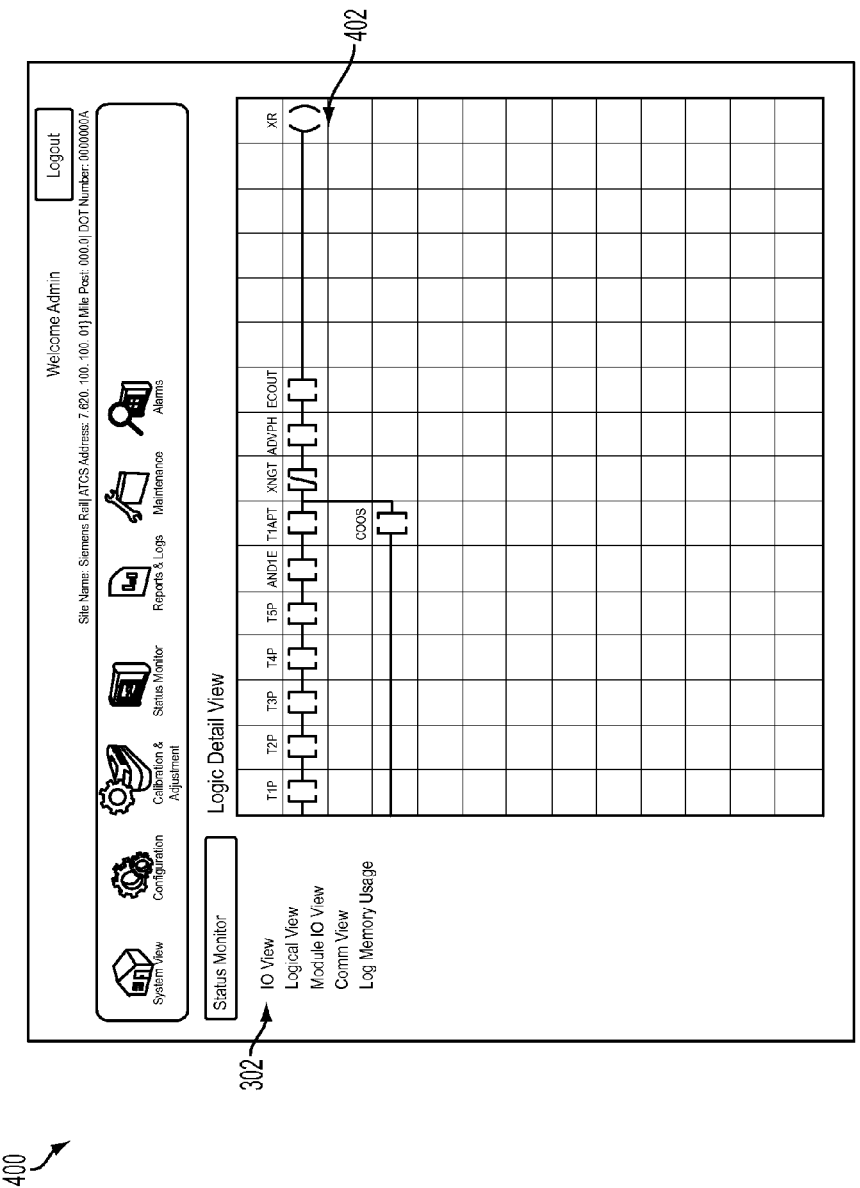
Figure 10:
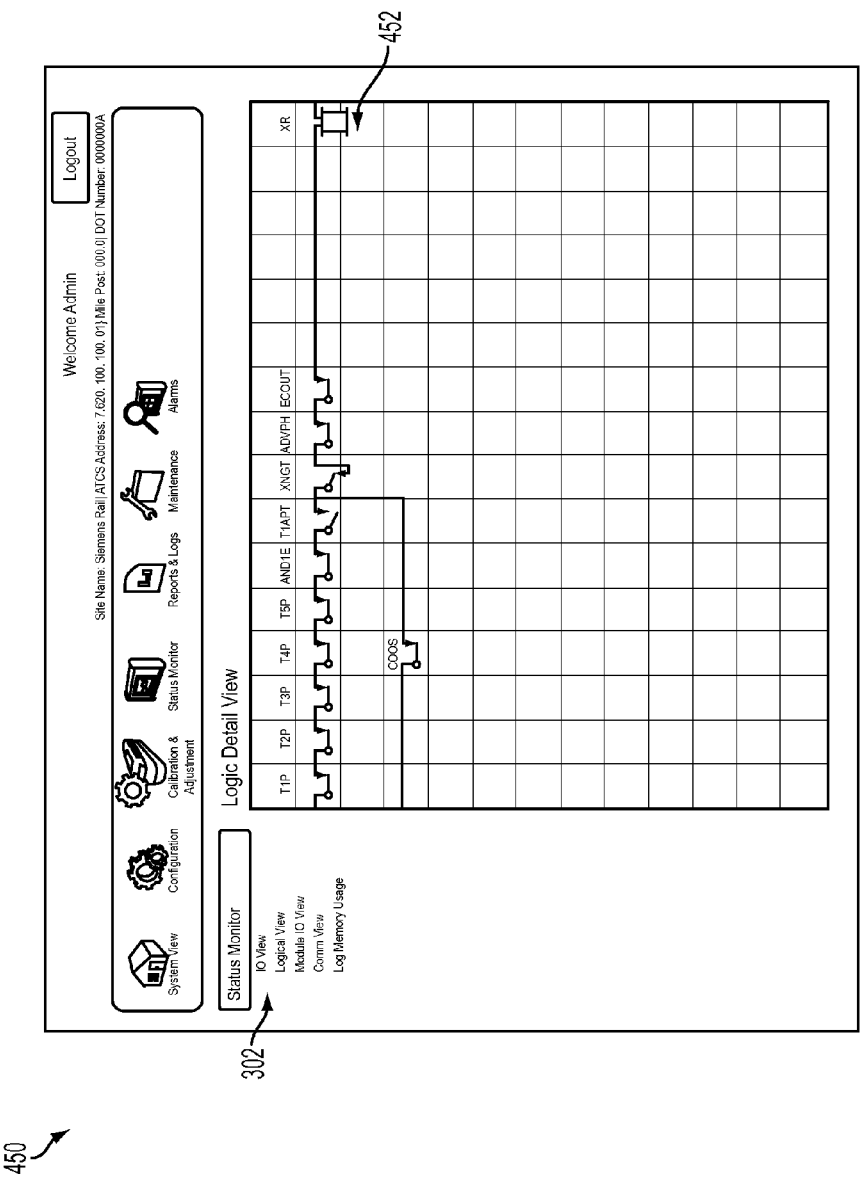
Figure 11:
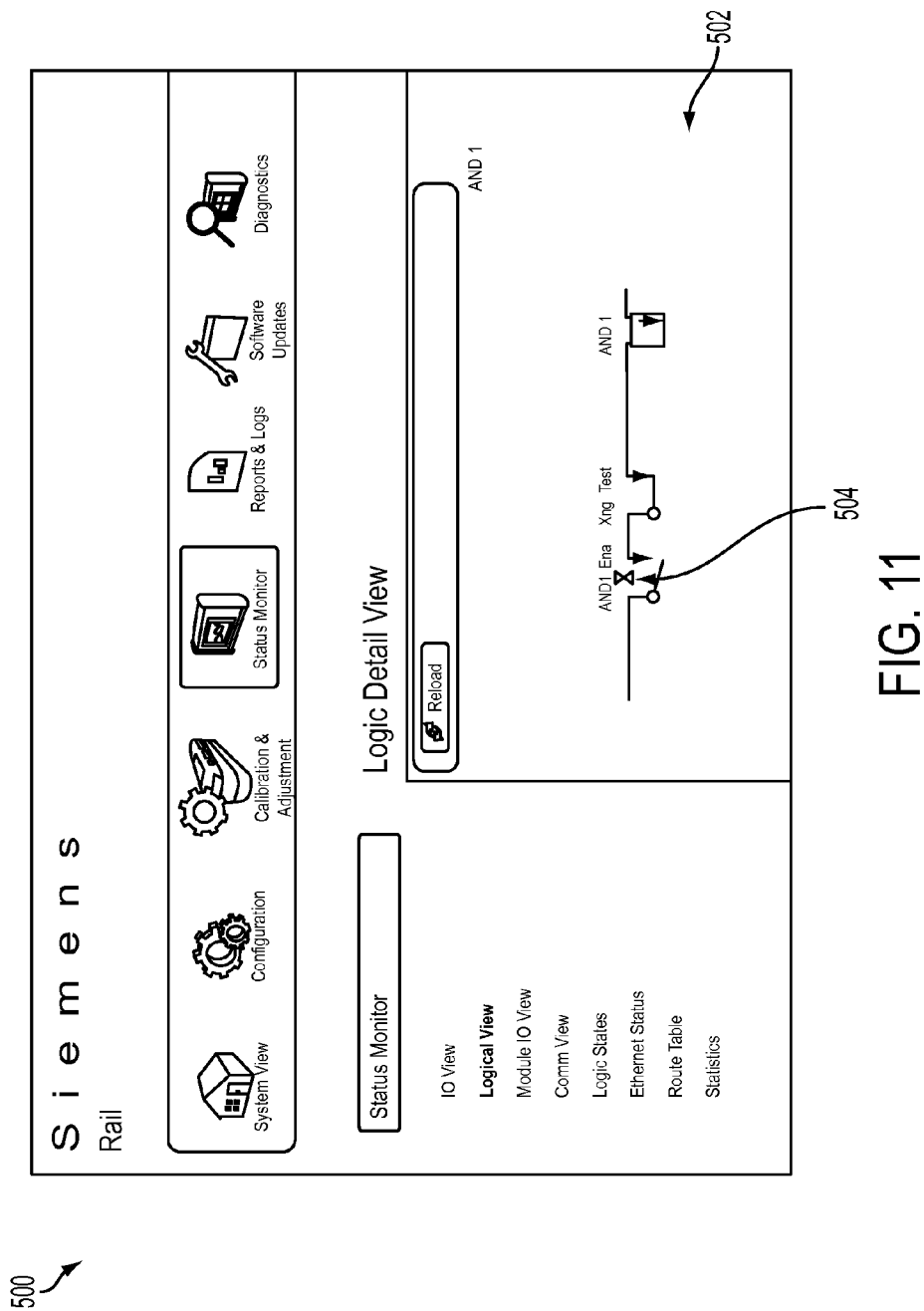

For example, FIG. 9 illustrates a "Logic Detail View" page 400 for one of the equations selected on page 350 of FIG. 8. FIG. 9 shows a ladder logic equation 402 comprising inputs T1P, T2P, etc. and logical operations that result in the output XR. Alternatively, the same information can be shown in a relay logic equation 452 as shown in the example page 450 illustrated in FIG. 10. Moreover, like the embodiments illustrated in FIGS. 2-6, the webpage-based user interface can also display timers. For example, FIG. 11 illustrates another example "Logic Detail View" page 500 having a ladder logic equation 502 with a timer 504 over a first input. Where possible, specific inputs can be selected to reveal additional information about the input and its status. As described above, specific colors can be used to indicate whether an item is selectable or not.

Figure 12:
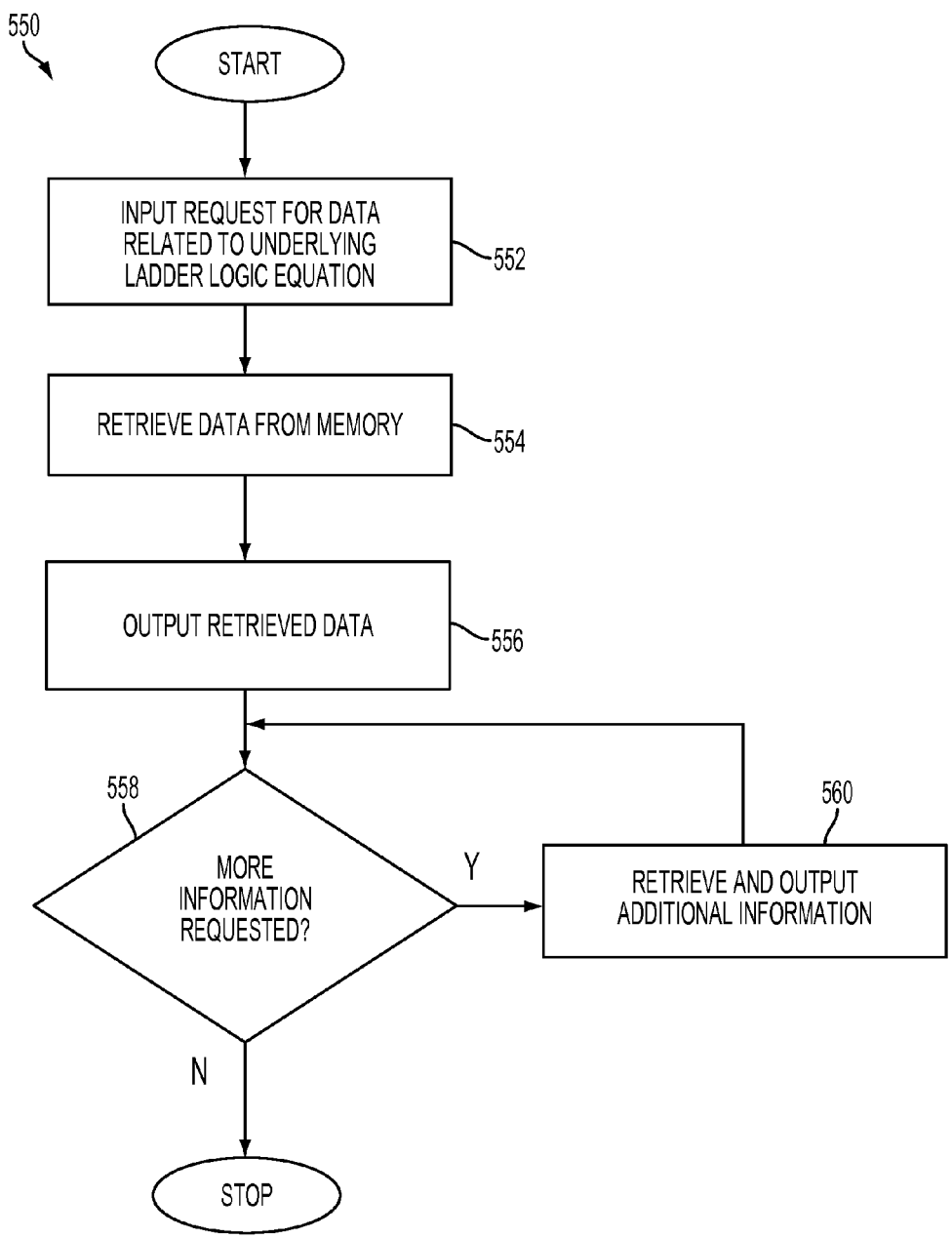
FIG. 12 illustrates an example method performed in accordance with an embodiment disclosed herein.

FIG. 12 illustrates an example method 550 performed in accordance with an embodiment disclosed herein. The method 550 is performed by a processor within the system 10 illustrated in FIG. 1. The method is implemented in computer executable program code stored in a memory of the system 10. The method 550 begins when a user input requesting data related to the underlying ladder logic equation for a system status output is received (step 552). As discussed above, the input can be received from an integrated display/user interface 30 (after an item is selected from the current screen such as e.g., screen 50 of FIG. 2) or from a computer/laptop directly connected to the CPU 12 or connected to the CPU 12 via a network (after an item is selected from the current webpage such as e.g., webpage 350 of FIG. 8).

Once the input is received, the processor retrieves from its memory or another memory within the system 10 real-time data processed by the underlying logic equation (step 554). Once retrieved, the real-time data is output by the processor (step 556). If the system 10 contains an integrated display/user interface 30, the outputted data could be graphically displayed as a ladder logic equation on a screen of the device 30 (e.g., screen 100 of FIG. 3). Alternatively, or in addition to, the outputted data could be displayed as a ladder logic or relay logic equation within a webpage (webpages 400, 450 of FIGS. 9 and 10). Once the real-time data and its logical association are displayed, the method 550 determines if there is a request for additional information (i.e., if a user has selected a selectable item on the displayed screen or a link on the displayed webpage (step 558). If it is determined that there is a request for additional information, the processor retrieves and outputs the additional information (step 560) so that information can be graphically displayed on a screen of the device 30 and/or within a webpage of a computer. These steps can be repeated if desired until there are no more requests by the user.

As can be seen, the disclosed principles provide real-time graphical information regarding the underlying logic (e.g., ladder logic equation) for a system status output. Because the underlying logic is displayed graphically, in a manner that a maintainer is familiar with, the maintainer is able to quickly determine system conditions that are contributing to a system abnormality. The maintainer is not forced to search through manuals, etc. to determine what could be the cause of an anomaly, which should dramatically speed up the troubleshooting process. Moreover, the maintainer does not need to rely on hunches or past experience to troubleshoot the system as key information is displayed in real-time and in a manner that shows how a system status output was derived.

The foregoing examples are provided merely for the purpose of explanation and are in no way to be construed as limiting. While reference to various embodiments is made, the words used herein are words of description and illustration, rather than words of limitation. Further, although reference to particular means, materials, and embodiments are shown, there is no limitation to the particulars disclosed herein. Rather, the embodiments extend to all functionally equivalent structures, methods, and uses, such as are within the scope of the appended claims.

Additionally, the purpose of the Abstract is to enable the patent office and the public generally, and especially the scientists, engineers and practitioners in the art who are not familiar with patent or legal terms or phraseology, to determine quickly from a cursory inspection the nature of the technical disclosure of the application. The Abstract is not intended to be limiting as to the scope of the present inventions in any way.

What is claimed is:

1. A method of displaying a railroad system status output, the system status output being a signal indicative of a status of a function associated with a gate crossing predictor device, and an underlying logic equation used to formulate the system status output, said method comprising:
   receiving, at a processor within the system, a request for real-time data associated with the gate crossing predictor device and processed by the underlying logic equation to formulate the system status output;
   retrieving, at the processor, the real-time data;
   outputting, from the processor, the real-time data; and
   displaying, on a user interface device, a graphic containing the underlying logic equation and comprising a logical association of the real-time data to the system status output,
   wherein the graphic is generated at the user interface device using system configuration information associating the real-time data to the system status output.

2. The method of claim 1, wherein the graphic comprises a ladder logic representation of the association of the real-time data to the system status output.

3. The method of claim 1, wherein the graphic comprises a relay logic representation of the association of the real-time data to the system status output.

4. The method of claim 1, wherein the graphic comprises one or more timers associated with the real-time data.

5. The method of claim 1, wherein the graphic comprises symbols representing logical operators.

6. The method of claim 1, further comprising:
   receiving, at the processor, a request for additional information about an element contained within the graphic;
   retrieving, at the processor, the additional information;
   outputting, from the processor, the additional information; and
   displaying, on the user interface device, a graphic comprising the additional information.

7. The method of claim 6, wherein the element is a system component whose status or output is used to formulate the system status output.

8. The method of claim 1, wherein the graphic comprises different colors associated with different states of the real-time data.

9. The method of claim 8, wherein the states comprise one of energized or de-energized.

10. The method of claim 1, the graphic comprises different colors associated with whether an item in the graphic is selectable, to reveal more information, or not selectable.

11. A railroad system, said system comprising:
    a gate crossing predictor device comprising a processor programmed to:
       receive a request for real-time data associated with said gate crossing predictor device and processed by a logic equation to formulate a system status output, the system status output being a signal indicative of a status of a function associated with said gate crossing predictor device;
       retrieve the real-time data;
       output the real-time data; and
    a user interface device connected to the processor, said device inputting and transmitting to the processor the request for real-time data, said device for receiving the real-time data from the processor and for displaying a graphic containing the underlying logic equation and comprising a logical association of the real-time data to the system status output, the graphic being generated at said user interface device using system configuration information associating the real-time data to the system status output.

12. The system of claim 11, wherein the graphic comprises a ladder logic representation of the association of the real-time data to the system status output.

13. The system of claim 11, wherein the graphic comprises a relay logic representation of the association of the real-time data to the system status output.

14. The system of claim 11, wherein the graphic comprises one or more timers associated with the real-time data.

15. The system of claim 11, wherein the graphic comprises symbols representing logical operators.

16. The system of claim 11, wherein the user interface device is adapted to input a request for additional information about an element within the graphic and to transmit the request to the processor, and the processor is adapted to receive the request for additional information, retrieve the additional information and output the additional information to the user interface device, and wherein the user interface device is adapted to display a graphic comprising the additional information.

17. The system of claim 16, wherein the element is a system component whose status or output is used to formulate the system status output.

18. The system of claim 11, wherein the user interface device is a display and input mechanism integrated within the system.

19. The system of claim 11, wherein the user interface device is a computer connected to the processor, the computer having a display and input mechanism.

20. The system of claim 19, wherein the computer is connected to the processor over a network.

21. The system of claim 20, wherein the computer displays the graphic in a webpage.

22. The system of claim 11, wherein the graphic comprises different colors associated with different states of the real-time data.

23. The system of claim 22, wherein the states comprise one of energized or de-energized.

24. The system of claim 11, the graphic comprises different colors associated with whether an item in the graphic is selectable, to reveal more information, or not selectable.

* * * * *